US009069733B1

(12) United States Patent
Meredith et al.

(10) Patent No.: US 9,069,733 B1
(45) Date of Patent: *Jun. 30, 2015

(54) ENTERPRISE ARCHITECTURE DIAGRAMMING SYSTEMS AND METHODS

(75) Inventors: Eric P. Meredith, Bridgeville, PA (US); Chad T. Jeffers, Pittsburgh, PA (US)

(73) Assignee: The PNC Financial Services Group, Inc., Pittsburgh, PA (US)

( * ) Notice: Subject to any disclaimer, the term of this patent is extended or adjusted under 35 U.S.C. 154(b) by 1601 days.

This patent is subject to a terminal disclaimer.

(21) Appl. No.: 12/555,951

(22) Filed: Sep. 9, 2009

(51) Int. Cl.
*G06F 17/24* (2006.01)
*G06F 17/22* (2006.01)
*G06F 17/30* (2006.01)

(52) U.S. Cl.
CPC ........ *G06F 17/2247* (2013.01); *G06F 17/3089* (2013.01)

(58) Field of Classification Search
CPC ........................................................ G06F 8/10
USPC .................. 715/211, 234, 733, 734, 762, 763
See application file for complete search history.

(56) References Cited

U.S. PATENT DOCUMENTS

| | | | |
|---|---|---|---|
| 6,668,253 B1 * | 12/2003 | Thompson et al. ................... 1/1 |
| 6,904,449 B1 * | 6/2005 | Quinones ....................... 709/203 |
| 7,072,807 B2 * | 7/2006 | Brown et al. ....................... 703/1 |
| 7,171,647 B1 * | 1/2007 | Smith et al. .................... 717/105 |
| 7,308,414 B2 * | 12/2007 | Parker et al. ................. 705/7.27 |
| 7,584,268 B2 | 9/2009 | Kraus |
| 7,644,390 B2 * | 1/2010 | Khodabandehloo et al. . 717/105 |
| 7,685,140 B2 | 3/2010 | Jackson |
| 7,716,254 B2 | 5/2010 | Sarkar et al. |
| 7,752,070 B2 | 7/2010 | Hatcher et al. |
| 7,756,735 B2 | 7/2010 | Sessions et al. |
| 7,818,682 B2 * | 10/2010 | Brand et al. ................... 715/763 |
| 7,975,254 B2 * | 7/2011 | Gilboa .......................... 717/117 |
| 8,060,828 B2 | 11/2011 | Griffith |
| 2002/0026630 A1 | 2/2002 | Schmidt et al. |
| 2004/0054985 A1 * | 3/2004 | Sewell ........................... 717/109 |
| 2004/0113937 A1 * | 6/2004 | Sawdey et al. ................ 345/738 |
| 2004/0143470 A1 | 7/2004 | Myrick |
| 2004/0236618 A1 * | 11/2004 | Smith et al. ....................... 705/7 |
| 2007/0162268 A1 | 7/2007 | Kota |

(Continued)

OTHER PUBLICATIONS

Office Action mailed Apr. 19, 2012 in U.S. Appl. No. 12/555,943.

(Continued)

*Primary Examiner* — Wilson Tsui
(74) *Attorney, Agent, or Firm* — Buchanan Ingersoll & Rooney PC; Robert J. Pugh

(57) ABSTRACT

An enterprise architecture storage and organization system is provided which includes user-editable webpages to display enterprise architecture content. The webpages are organized in a framework, such as the Zachman Framework. The framework may comprise a plurality of units grouped into a plurality of levels and a plurality of categories. Each unit may have a user-editable webpage associated with it. The level of detail included within each user-editable webpage is variant depending upon the location of its associated unit in the framework. Units at the top of the framework contain broad or general information and the level of detail downwardly increases. Users may selectably edit the content of the user-editable webpages using an editor. Users may edit the text and edit and attach graphics. In some embodiments, wiki-type functionality may be utilized. The content of the various user-editable webpages may be standardized based on level and category.

20 Claims, 19 Drawing Sheets

(56) References Cited

U.S. PATENT DOCUMENTS

| | | |
|---|---|---|
| 2007/0244906 A1* | 10/2007 | Colton et al. .................. 707/10 |
| 2007/0288275 A1 | 12/2007 | Kumar |
| 2008/0010387 A1* | 1/2008 | Curtis et al. ................. 709/246 |
| 2008/0040674 A1 | 2/2008 | Gupta |
| 2008/0255997 A1 | 10/2008 | Bluhm et al. |
| 2009/0113378 A1 | 4/2009 | Boyer |
| 2010/0030893 A1 | 2/2010 | Berg |
| 2010/0107165 A1 | 4/2010 | Koskimies et al. |
| 2010/0138250 A1 | 6/2010 | Brown et al. |
| 2010/0293182 A1 | 11/2010 | Karhinen et al. |

OTHER PUBLICATIONS

U.S. Appl. No. 12/338,774, filed Dec. 18, 2008.
U.S. Appl. No. 12/555,943, filed Sep. 9, 2009.
Office Action mailed Aug. 22, 2011 in U.S. Appl. No. 12/338,774.

* cited by examiner

1.1. DEFINITION/SCOPE

[z] THIS TOPIC IS FREQUENTLY COMPRISED OF A SHORT NARRATIVE FOLLOWED BY A BULLETED LIST, OR A SIMPLE BLUEPRINT GRAPHIC. THIS TOPIC IS SOMETIMES DIFFICULT BECAUSE IT IS SO OBVIOUS. ALL THAT IS NEEDED HERE IS A SHORT NARRATIVE WITH A BULLETED LIST OF THE TOPICS, ITEMS, ISSUES, OR THINGS IMPORTANT TO THE BUSINESS.

THINK ABOUT THE THINGS YOU MONITOR AND MEASURE, AND THE THINGS YOU INCLUDE IN PERFORMANCE REPORTS. THESE ARE LIKELY THE THINGS IMPORTANT TO THE ENTITY. KEEP IT HIGH LEVEL, AND AVOID MENTIONING SPECIFIC REPORTS, METRICS, OR GOALS/QUOTAS. "ENGINE EFFICIENCY" IS VALID FOR THE SCOPE LEVEL, WHEREAS "NUMBER OF OIL CHANGES" IS NOT.

EXAMPLES OF BUSINESS-RELATED TOPICS AND/OR HIGH LEVEL TECHNICAL THINGS THAT ARE IMPORTANT TO THE ENTITY MIGHT INCLUDE:

- RELIABILITY
- SERVER PERFORMANCE
- PROFITABILITY
- INFORMATION SECURITY
  - CONFIDENTIALITY
  - INTEGRITY
  - AVAILABILITY

[Q] IF YOUR TEAM MANAGES DATABASE TECHNOLOGY, THEN MAKE SURE DATABASE MANAGEMENT IS IN THE NARRATIVE (FOR EXAMPLE).

[Q] MAKE SURE TO INCLUDE THE THINGS YOU MEASURE SUCH AS UP-TIME, CUSTOMER SATISFACTION, COSTS -- AND OTHER QUANTIFIABLE VALUE YOU COMMUNICATE.

FIG. 5A

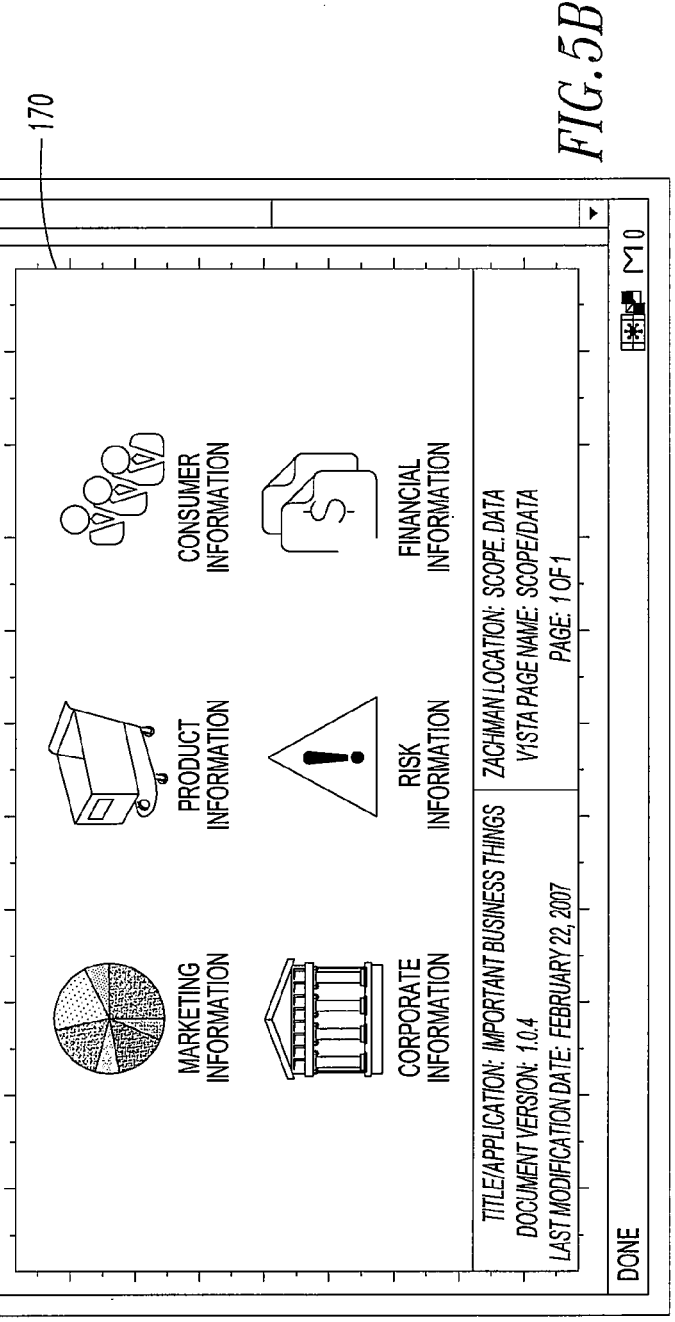

THE DATABASE GROUP'S PRIMARY OBJECTIVE INCLUDE:

* MANAGING AND IMPLEMENTING CHANGE REQUESTS
* MANAGING AND IMPLEMENTING NEW DATABASE PROJECTS
* INCREASING SPEED TO MARKET EFFICIENCIES
* STANDARDIZATION OF SUPPORTED ARCHITECTURES
* IMPLEMENTATION OF STANDARD REPEATABLE PROCESSES
  * PROJECT MANAGEMENT INTERFACING
  * PROACTIVE DATABASE MONITORING
  * QUALITY OF SERVICE

← 184

% STOPINCLUDE%

% COMMENT{ type=" tableprepend " }%
| RETHINK THIS SIMPLE LIST AND PLACE ON IT THE 'ITEMS OF IMPORTANCE' BASED ON THE REPORTS YOU PRODUCE, THE PRESENTATIONS YOU GIVE, AND THE ACCOUNTABILITIES YOU MANAGE. </td><td>_ MAIN . ERICMEREDITH </td><td>_ 01 JUL 2007 - 20:53 ||

MORE

DONE

*FIG.6B*

SHOW: CLICK ON SHOW ALL ATTACHMENTS TO DISPLAY A LIST OF ALL EXISTING ATTACHMENTS.

COPYRIGHT © PNC FINANCIAL SERVICES. ALL MATERIAL ON THIS WIKI IS CONSIDERED CONFIDENTIAL AND THE PROPERTY OF THE PNC FINANCIAL SERVICES GROUP. 
IDEAS, REQUESTS, PROBLEMS REGARDING THE EA WIKI? SEND FEEDBACK

SYNDICATE THIS SITE  RSS  ATOM

DONE

ENTERPRISE ARCHITECTURE DIAGRAMMING SYSTEMS AND METHODS

BACKGROUND

The collection and organization of Architecture Documentation or other departmental information is an important process designed to enhance interdepartmental communications, improve employee interactions, as well as meet the increasing demands of regulatory bodies. In some corporations, the knowledge of a department's processes, important data, and motivation is kept internally within the department. This knowledge may exist in many forms, such as in mission documents maintained by managers, in documents stored online or in paper format, on intranet sites, or even in employees' heads. Often, knowing how best to interact with another department or accessing certain knowledge or data becomes a task in knowing the right person to call or bookmarking the right intranet page. Moreover, new employees are often at the most disadvantage as experience with other organizations or groups within the corporation is often the only way to gain an understanding of how a department works and why they operate the way they do.

The wealth of information maintained by a department about its inner workings can be unwieldy. From the broadest mission statement to the most minute implementation detail, the breadth and depth of the data that signifies how and why a department functions requires organization and consistency in order to be useful to those unfamiliar with the department.

Furthermore, as a variety of enterprise architecture drawings and diagrams are developed by various employees, individuals, or entities, many different techniques may be used to represent enterprise architectures. The use of non-uniform architecture diagrams may impede the use, understanding, or effectiveness of the architecture diagrams.

In view of the foregoing issues, a need exists for convenient systems and methods that can more efficiently assist in the storage, development, and organization of enterprise architecture content.

BRIEF DESCRIPTION OF THE FIGURES

The utility of the embodiments of the invention will be readily appreciated and understood from consideration of the following description of the embodiments of the invention when viewed in connection with the accompanying drawings.

FIGS. 5A-5B illustrate an author help screen in accordance with various embodiments; and FIGS. 6A-6B illustrate an editor in accordance with various embodiments.

FIGS. 8A-8C illustrate a screenshot of reference materials in accordance with various embodiments;

DESCRIPTION

The Zachman Framework for Enterprise Architecture is a known technique for providing a platform for organizing departmental material into a consistent and navigable structure. The Zachman Framework organizes architecture documentation into six primary categories each with five levels of granularity. The six categories generally break the information down into the 'who', 'what', 'why', 'where', 'when' and 'how' of a department's existence.

Although the Zachman Framework may provide a platform for organizing information, the techniques for implementing the framework may be improved. For example, organizations that attempt to use the Zachman Framework, or any other type of informational storage system, may compile an extremely large amount of printed materials, including reports, diagrams, tables, and lists. In some cases, three-ring binders containing information that is often incomplete, inconsistent, and potentially incorrect due to the laborious manner in which the information was maintained are used. These storage systems are typically rarely updated or referenced.

Figures 1A, 3:
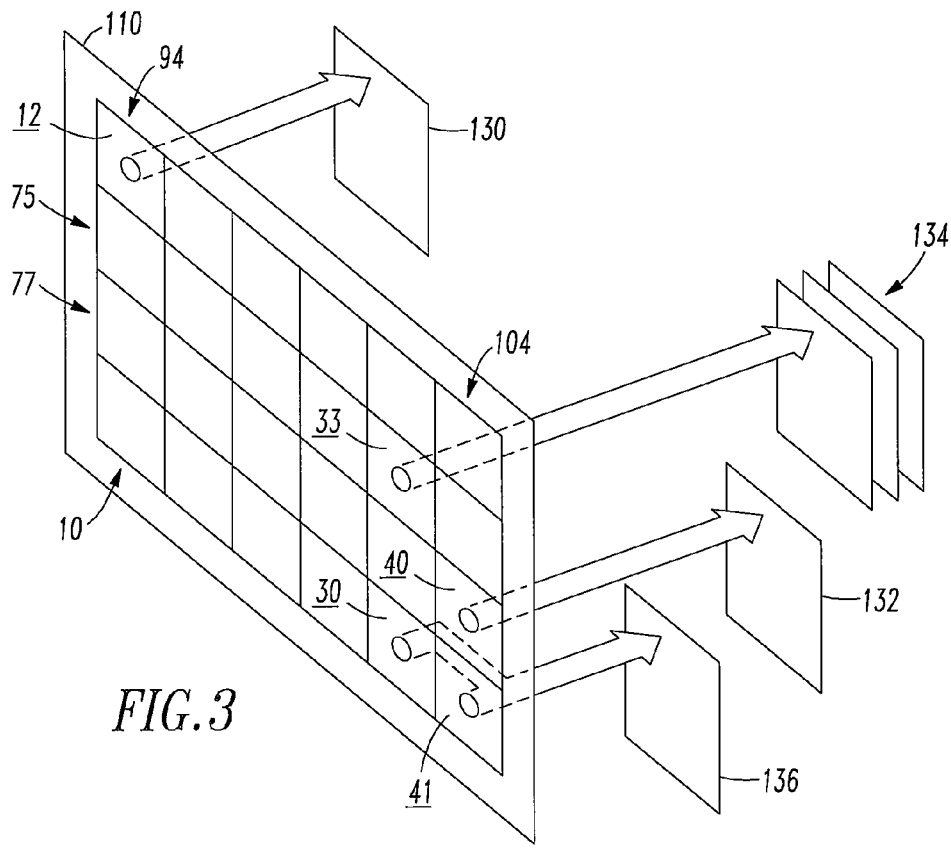
FIG. 1A includes a schema in accordance with various embodiments.
FIG. 3 is a diagram of the framework and associated webpages in accordance with various.
Figure 1B:
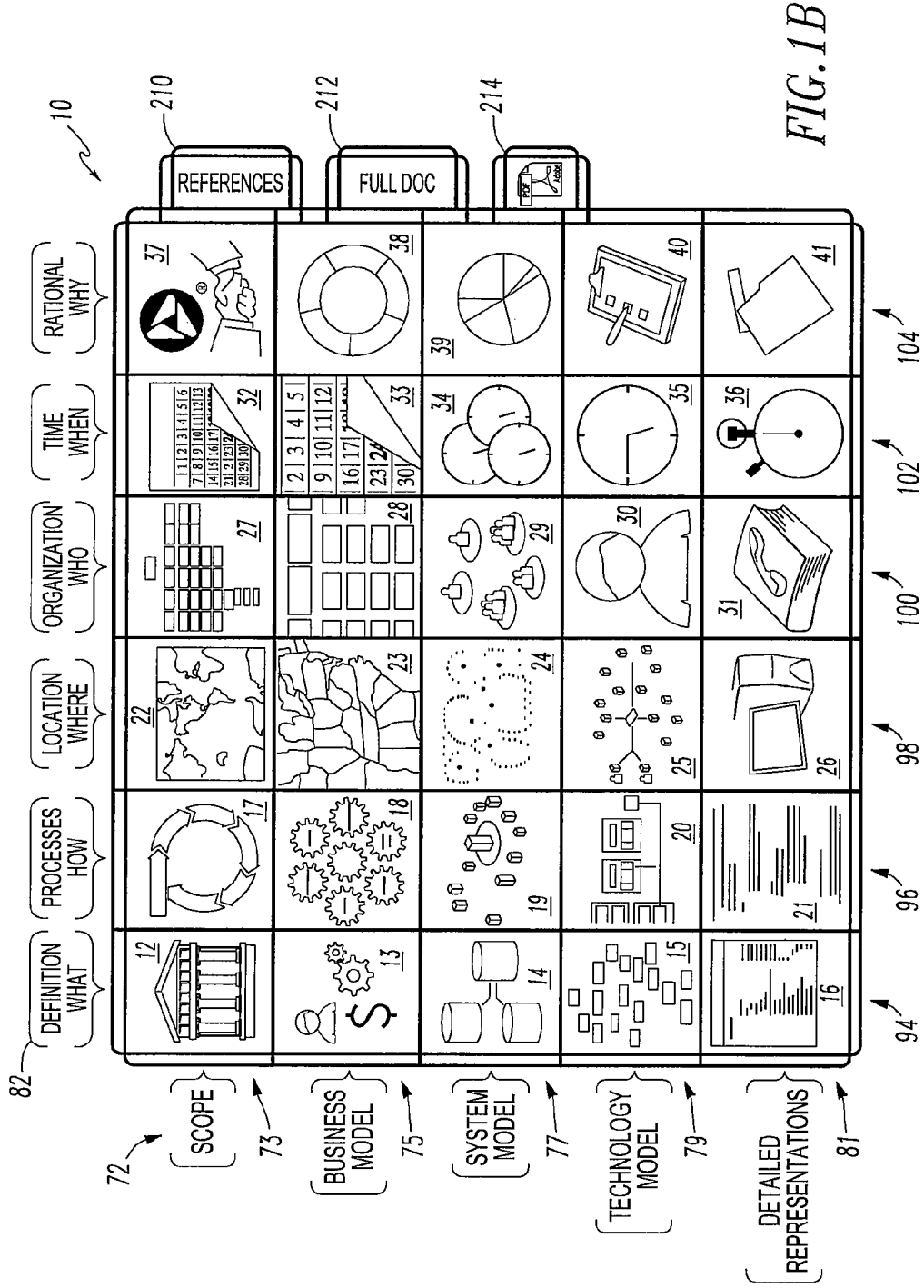
FIG. 1B includes a framework in accordance with various embodiments.

As discussed below, in various embodiments, a user-modifiable system and method is disclosed that provides dynamic and updatable webpages for storing and displaying information, such as enterprise architecture information. The information may be collected and accessed through a "wild" interface. A wild is a webpage or collection of webpages designed to enable users who accesses it to contribute or modify its content. As appreciated by those skilled in the art, a wild interface typically uses a simplified markup language. Various software platforms may be used to implement wiki technology, such as TWIKI. As illustrated in FIG. 1A, the information stored may be grouped according to a schema 11. The schema 11 may define various levels 301 and categories 303 to create a framework 10 of units 12-41 (FIG. 1B). It is appreciated that various schemas 11 may be utilized. For example, some schemas may use different subject matter in the various levels and categories, or use different arrangement of the information. Additionally, some schema may utilize more or less levels and/or more or less categories, or arrange the information in non-grid formations.

Referring now to FIG. 1B, a sample embodiment of the framework 10 implementing the schema 11 is illustrated. The framework 10 may be a table or grid comprised of a plurality of individual units 12-41. The content of each level may be specified by a header associated with each level. For example, a level 73 relates to "Scope" content, a level 75 relates to "Business Model" content, a level 77 relates to "System Model" content, a level 79 relates to "Technology Model" content, and a level 81 relates to "Detailed Representations" content. It is appreciated that the headers and/or content for each level, or other type of grouping, may be modified for different applications. In this example, the level of detail provided in each level downwardly progresses from broad to narrow. For example, the content in the "Scope" level is broader than the content in the "Business Model" level, and the content in the "System Model" level is broader than the content in the "Detailed Representations" level. In various embodiments, the framework 10 may be the Zachman Framework for Enterprise Architecture, or a variant thereof, as described at http://www.zifa.com/. It is appreciated that various embodiments may employ varying level headers. Further, as illustrated in FIG. 1B, the individual units of the framework 10 may include graphics and/or text to help identify the content related to the unit.

The Scope level 73 may provide the broadest level of granularity or detail. For example, this level may hold information intended for a CEO level employee. With minimized technical details, this level may provide a general overview, and may be designed to portray the key ideas behind the details that are expressed in the lower levels.

The Business Model level 75, which still may be lacking technical terminology, may expand upon the ideas listed in the Scope level 73. In various embodiments, the information provided at this level may be most valuable to business units that interact with the department.

The System Model level 77 may focus on information for a first department that is valuable to other departments. For example, this level 77 may provide another department with information related to how best interact with the first department. Request systems, available services, and the means to utilize them may appear in this level.

The Technology Model level 79 may be dedicated to a more detailed view of the technologies used to implement the concepts described in the broader levels above. For example, application components and how they interact, infrastructure elements and their connectivity, and deployment details of purchased commercial products may appear in this level.

The Detailed Representations level 81 may include application source code, employee directories, IP address tables, or stock prices, for example. Links repositories of such information may be added when applicable.

The framework 10 may comprise a plurality of categories for each level. The content for each category may be specified by an associated header. For example, the framework may comprises a category 94 that specifies "Definition-What," a category 96 the specifies "Processes-How," a category 98 that specifies "Location-Where," a category 100 that specifies "Organization-Who," a category 102 that specifies "Time-When," and a category 104 that specifies "Rationale-Why." It is appreciated that the headers and content for the various categories may be modified for different applications.

The Definition-What category 94 may be used to house information about the data that is important to a department. For example, information such as server uptime, network throughput and request turnover times may fall into this category.

The Processes-How category 96 may be used to house information about the procedures a department follows on a regular basis. For example, the steps taken to acquire and install a new server, the process for making a change to a production system, and the procedure that employees must follow when making a request of the department are examples of information that may appear in this category.

The Location-Where category 98 may be used to house information about the physical location of a department's resources. For example, information related to where the department's employees are located, the position on the network of a departmentally owned or managed server, or a company's business operations footprint may appear in the documentation in this category.

The Organization-Who category 100 may be used to house information about the department's employees. For example, the different positions within the department and the skills required to perform those positions may appear in this category.

The Time-When category 102 may be used to house time-sensitive and repeating tasks. For example, the monthly, quarterly, and year-end freeze schedule, reoccurring capacity appraisals, yearly budget planning, and even employee evaluations may fit into this category.

The Rationale-Why category 104 may be used to house information about why a department's motivation. For example, the content may relate to providing a service, increasing revenue, and complying with a specific regulatory requirement are examples of items that may appear in this category.

Figure 2:
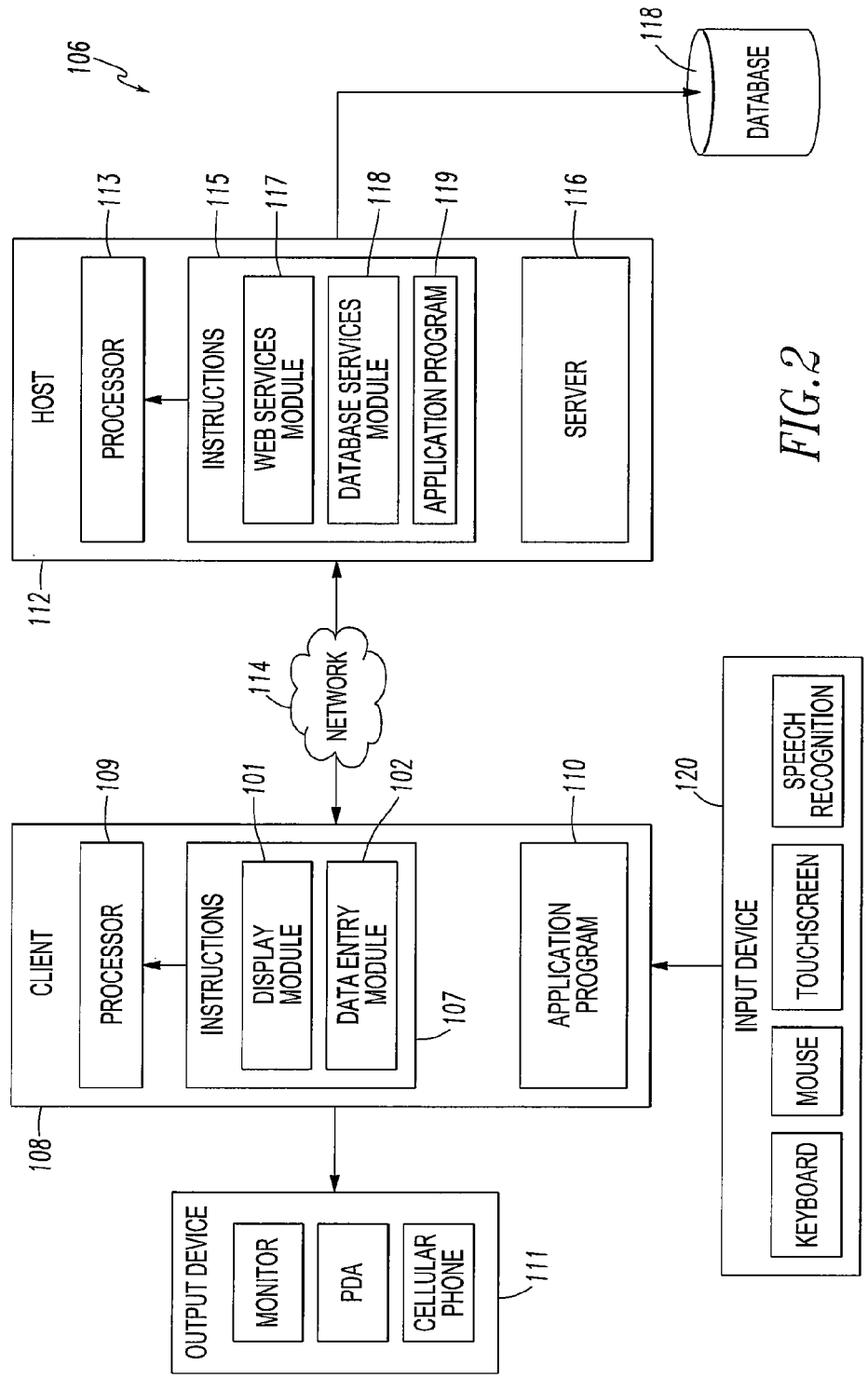
FIG. 2 is a diagram of a one embodiment of system for presenting the framework shown in FIG. 1 to a user.

FIG. 2 is a diagram of a system 106 for presenting the framework 10 (FIG. 1B) to a user according to various embodiments. The user may view the framework 10 on a client device 108, which may include an application program 110, such as a web browser, for displaying the framework 10. The client device 108 may also comprise a processor 109 that may execute instructions 107. The instructions 107 may be stored in a computer readable medium. The instructions 107 may include various modules, such as a display module 101 and a data entry model 102. The client device 108 may be any type of device capable of receiving, rendering and displaying the framework 10 such as, for example, a portable computer (PC), a laptop computer, a workstation, a cellular telephone, a kiosk, or a personal digital assistant (PDA), etc. The client device 108 may include an input device 120 to supply user input to the client device 108. The input device 120 may be, for example, a keyboard, a mouse, and/or a speech recognition module, for example. The input device 120 may be separate from or integrated with the client device 108. The client device 108 may comprise an output device 111. The output device 111 for displaying the framework 10 may be any suitable device, such as a monitor, PC, laptop, PDA, or cell phone, for example. The framework 10 may be, for example, part of a web page or other document that is served to the client device 108 from a host computing device 112 (referred to hereinafter as the "host") through a network 114. The host 112, which is shown as a single device in FIG. 2 but which may be embodied as a series of networked computing devices, may include a server 116 for generating the web pages or documents comprising framework 10 based on data stored in one or more databases 118. The host 112 may also comprise a processor 113 that may execute instructions 115. The instructions 115 may be stored in a computer readable medium. The instructions 115 may comprise various modules, such as a web services module 117, a database services module 118, and an application module 119. The server 116 may serve the generated web pages or documents via the network 114 to the client device 108.

The framework 10 may be viewed on an application program 110, such as a web browser. As illustrated in FIG. 3, each unit 12-41 in the framework 10 may have a webpage associated it. For example, the unit 12 may have a website 130 associated with it. Similarly, the unit 40 may have a website 132 associated with it. As appreciated by those skilled in the art, certain units may have a plurality of associated webpages, such as webpages 134. Furthermore, in some embodiments, a single website 136 may be associated with a plurality of units of the framework 10. The content of the webpages associated with the units of the framework 10 may be stored in database 118 (FIG. 2), or any other suitable storage location. A user viewing the framework 10 may select an individual unit 12-41 to view the content on the associated webpage. For example, the user my "click" on the unit using the input device 120

(FIG. 2). In various embodiments, the user my select individual units by touching a touch screen, using a stylus, voice command, or any other suitable selection technique. After selecting the desired unit, the associated webpage may be displayed on the client device 108.

Figure 4A:
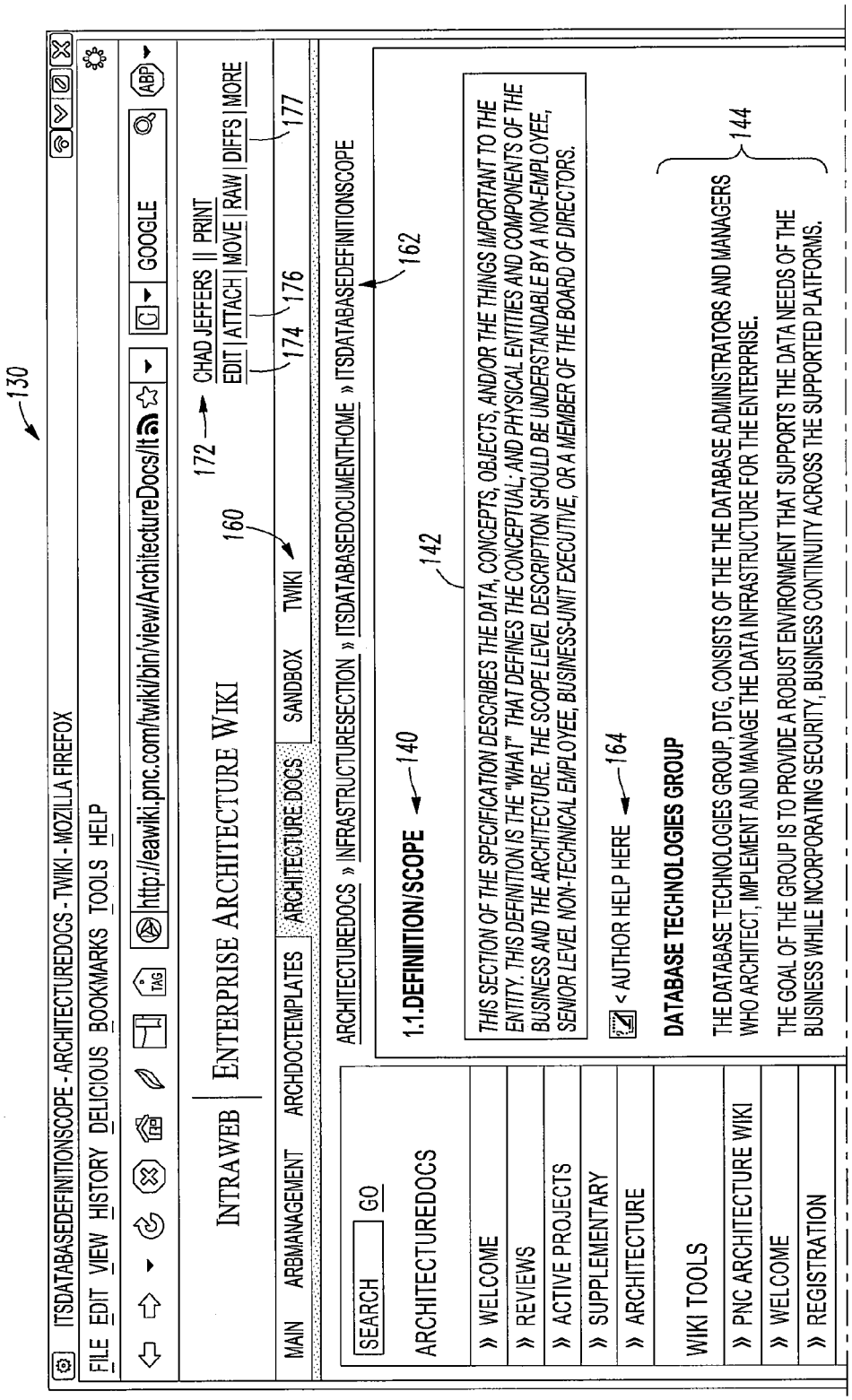
FIGS. 4A-4B illustrate a user-editable webpage in accordance with various embodiments.
Figure 4B:
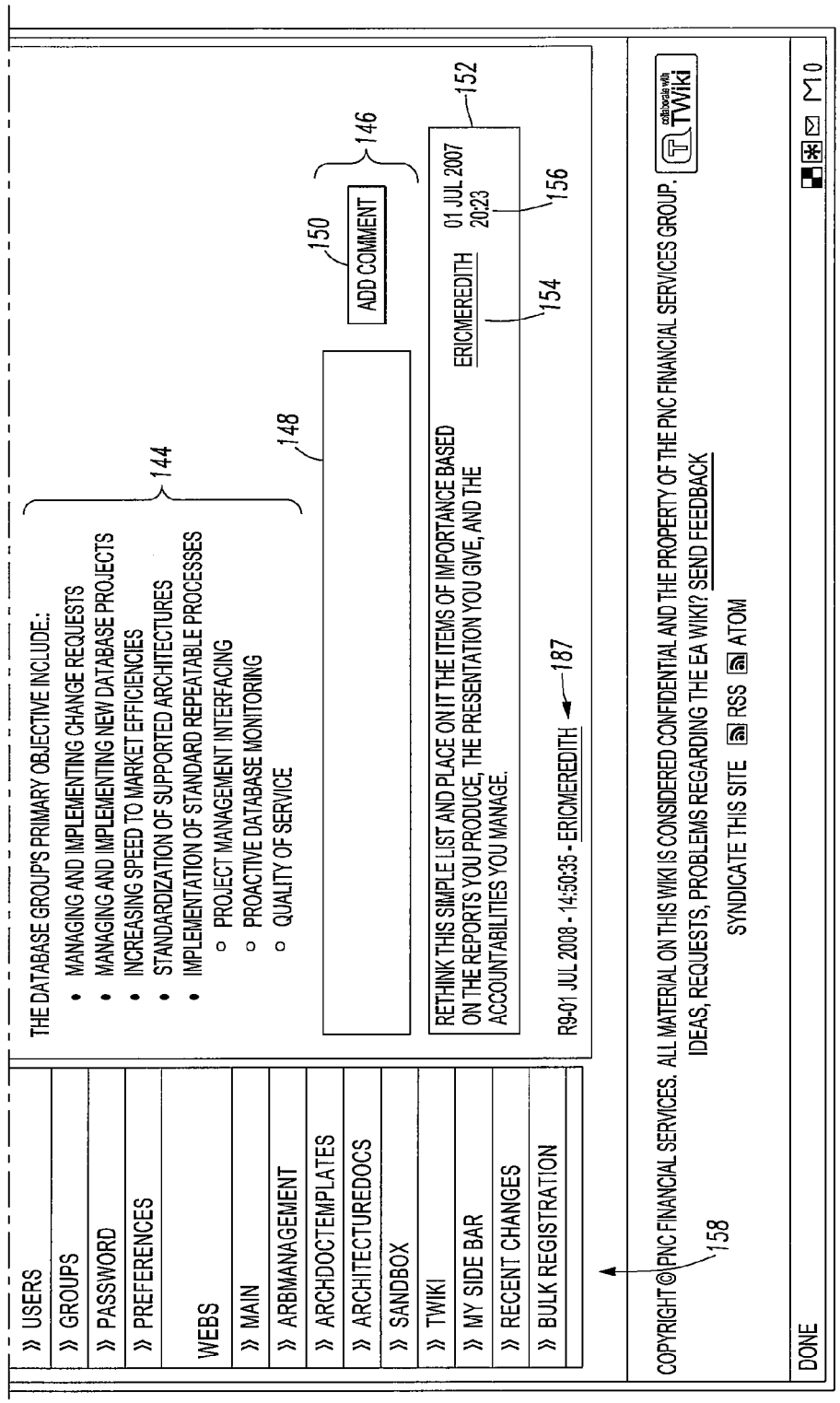

A sample embodiment of the webpage 130 is shown in FIGS. 4A-4B. In various embodiments, the webpage 130 may have a title field 140. In the illustrated embodiment, the title field 140 indicates the webpage 130 is associated with "Definition/Scope," or unit 12. The webpage 130 may also include a description box 142. The description box 142, for example, may describe the type of content or information that should be included on the webpage. The description box 142 may be perpetually displayed on the webpage 142 or may be selectably accessible. The webpage 130 may also include a content field 144. The content field 144 may be populated with relevant information. For example, content related to the "Definition/Scope" may be included on the webpage 130. In various embodiments, the content field 144 may include numbered lists, bulleted lists, outlines, graphics, flowcharts, paragraphs, tables, architecture diagrams, models, figures, schematics, drawings, hyperlinks, images, symbols, or any other type for form of content useful to the user. As appreciated by those skilled in the art the content or information displayed in the content field 144 may be specific to the scope of the unit associated with the webpage.

Still referring FIGS. 4A-4B, in various embodiments the webpage 130 may include a comment entry section 146. The comment entry section 146 may include, for example, a comment entry field 148 and a comment button 150. Using the comment entry section 146 a user may selectively type comments into the comment entry field 148 and select the comment button 150. Upon selecting the button 150, the typed comments may appear in the comment list 152. Subsequent users viewing the webpage 130 may view the comments. As illustrated, the comment list 152 may include an author 154 and a timestamp 156. As appreciated by those skilled in the art, the webpage 130 may also comprise a menu 158 and/or other navigational tools, such as a set of tabs 160, or a hierarchical menu 162. In various embodiments, multiple menus, tabs, or hierarchical menus, may be used.

The webpage 130 may also include an author help feature 164. As shown in FIGS. 5A-5B, selecting the author help feature 164 may display a help screen 166. The help screen 166 may be displayed using any suitable technique, such as a separate webpage or a pop-up window, for example. In various embodiments, the help screen 166 may include a content section 168. The content section 168 may describe the type of content or information that should be included on the webpage, provide illustrations, and/or otherwise provide assistance. As illustrated, the help screen 166 may comprise a graphic 170 to assist the user.

Figure 6A:
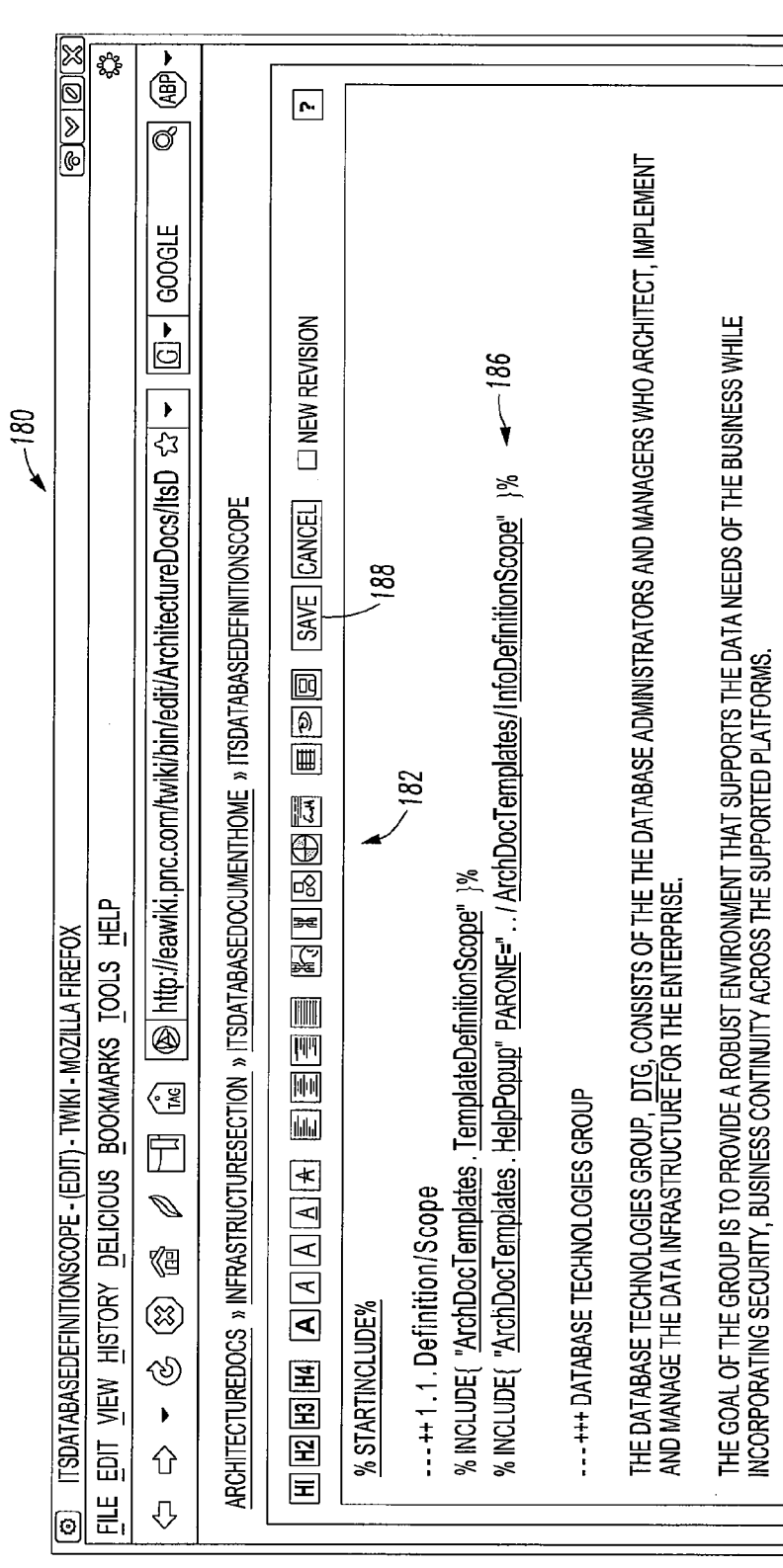

In various embodiments, as appreciated by those skilled in the art, the webpages associated with the units may incorporate "wiki" functionality or be managed as a wild. Referring again to FIGS. 4A-4B, the webpage 130 may include a revision menu 172. The revision menu 172 allows for users to contribute or modify the contents of the webpage. In various embodiments the revision menu 172 may include a plurality of features for allowing a user to edit, revise, or otherwise amend the webpage 130. For example, the revision menu 172 may include an edit feature 174 and an attach feature 176. The revision menu 172 may be displayed in any suitable format, such as text-based (as illustrated), graphical based, or a combination of both. A user may select one of the features in the revision menu 172 using the input device 120. For example, as illustrated in FIGS. 6A-6B, if a user selects the edit feature 174, an editor 180 may be displayed.

The editor 180 allows the user to edit the content of the webpage 130. For example, the user may be able to edit the information contained in the content field 144. The editor 180 may include a formatting menu 182 for formatting the content of the webpage 130. The editor 180 may also include an edit field 184 that displays the content of the webpage 130. The edit field may include references to other documents, such as references to templates 186. The edit field 184 gives the user access to the content displayed on the webpage 130 so that the user can modify the information. Accordingly, the user may perform any edit to the content, such as revising, updating, deleting, or inserting. In various embodiments, certain universal formatting may be established to ensure consistency between the various entries. For example, a certain type of formatting may be established for first level headings, second level headings, or tables. Upon completing the change, the user may select a save feature 188. As illustrated, any comments present on webpage 130 may also be included in the editor 180. Once the change has been saved, the changes will be reflected on the webpage 130 the next time it is accessed by any user. The name of the last person to perform an edit or revision to a page may be displayed in a footer 187 (FIG. 1). In various embodiments, other information may be included in the footer.

Figure 7A:
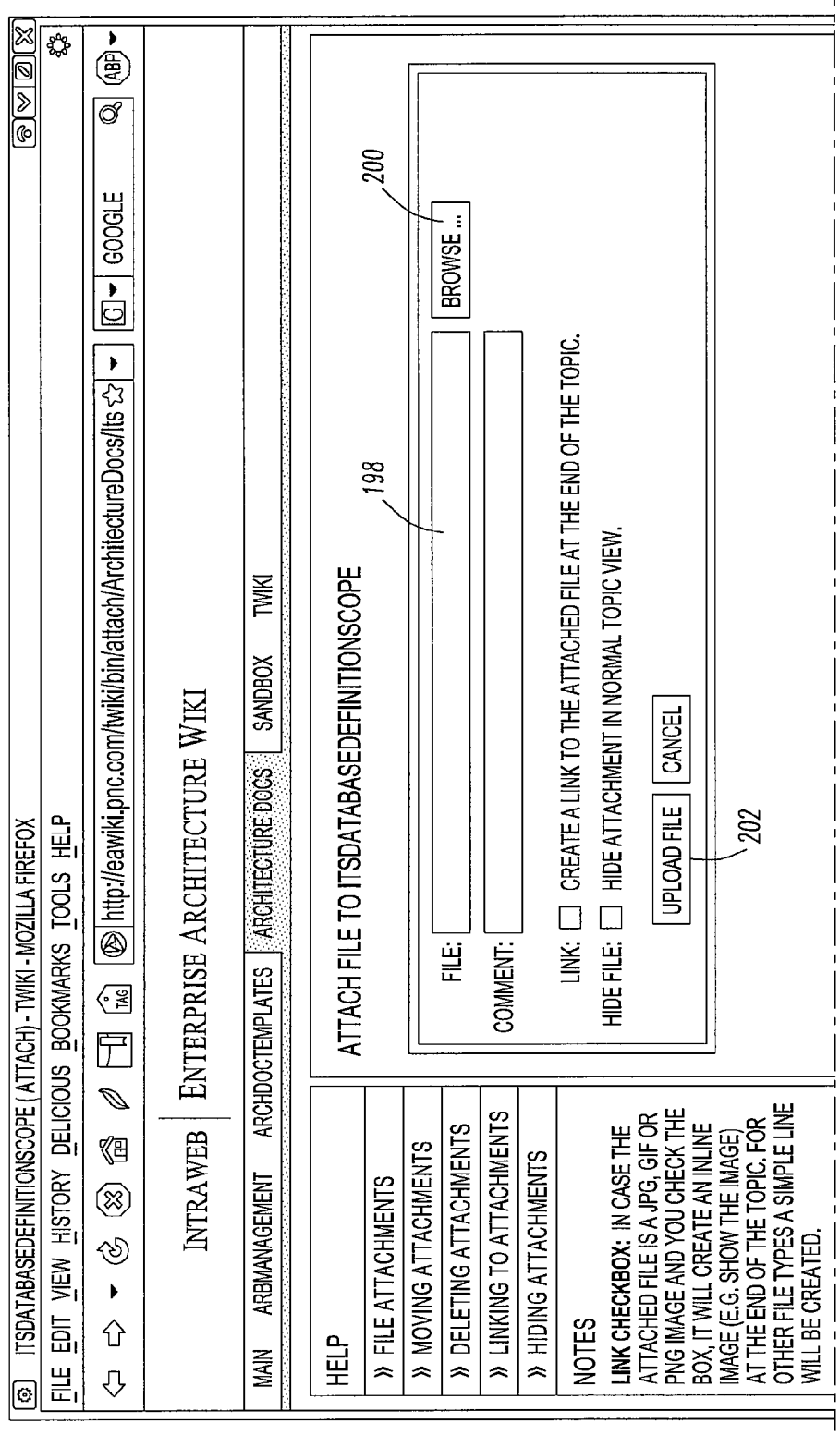
FIGS. 7A-7B illustrate a file attachment utility in accordance with various embodiments.
Figure 7B:

If a user selects the attach feature 176, an attach screen 196, as illustrated in FIGS. 7A-7B, may be displayed. Using the functionality of the attach screen 196, the user can selectably attach a file to the webpage 130. To attach a file, the user populates the file field 198 with a file name. The user may type the name or may use a browse feature 200 to locate the file on a hard drive, for example. The various versions of the attached files may also be stored and maintained for future reference.

Once the file field 198 has been populated, the user may select the upload file field 202 to attach the file. In various embodiments, if an image file is attached, it may appear as an image inline with the content field 144. Some files, such as documents or PDF, may appear as a hyperlink on the website 130. As appreciated by those skilled in the art, when viewing the webpage 130, a user can select the hyperlink to access the attached document of file. In various embodiments, a graphical representation of the file, such as a JPG or GIF file may be uploaded so that it will appear inline with the text and content of the webpage 130. A version of the file from which the graphical representation was created, such as a VISIO file, may also be attached. Furthermore, a diffs feature 177 may be selected in order to view the various versions of the webpage. In some embodiments, individual versions may be viewed or multiple versions may be compared in a side-by-side format.

Referring again to FIG. 1, as outlined above, each unit 12-41 has at least one user-editable website associated with it. Accordingly, when viewing the framework 10, users may select a desired unit and view the associated webpages. Using the editing features described above, the user may edit or revise the content of any of the associated webpages. Using this functionality, users may maintain the correctness and completeness of the information. The framework 10 may also include other features, such as a reference feature 210, a full doe feature 212, or a PDF features 214. Those skilled in the art may appreciate that other features may be used, or the features may be displayed using various techniques, such as a text-based menu.

Figure 8A:
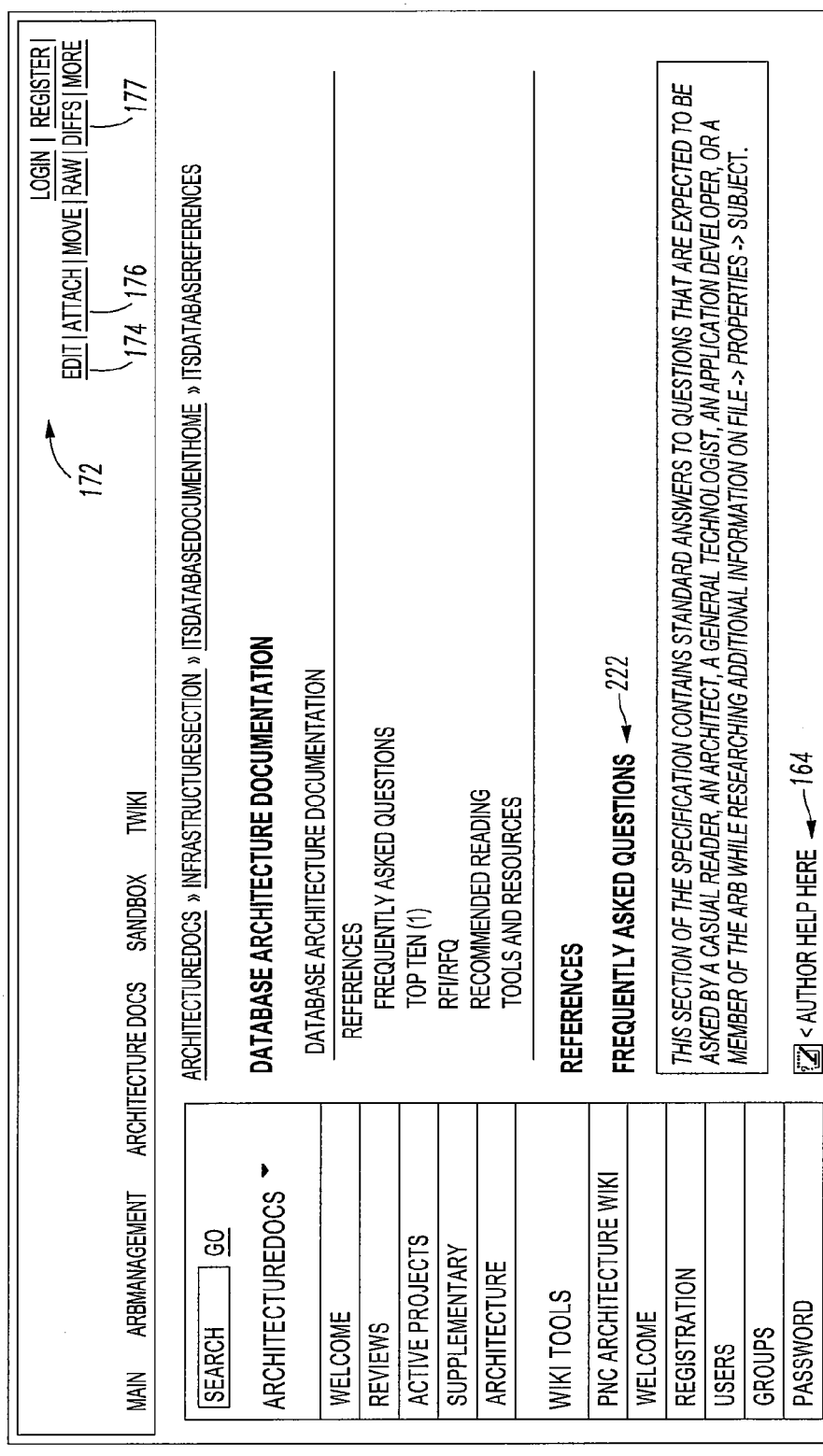
Figure 8B:
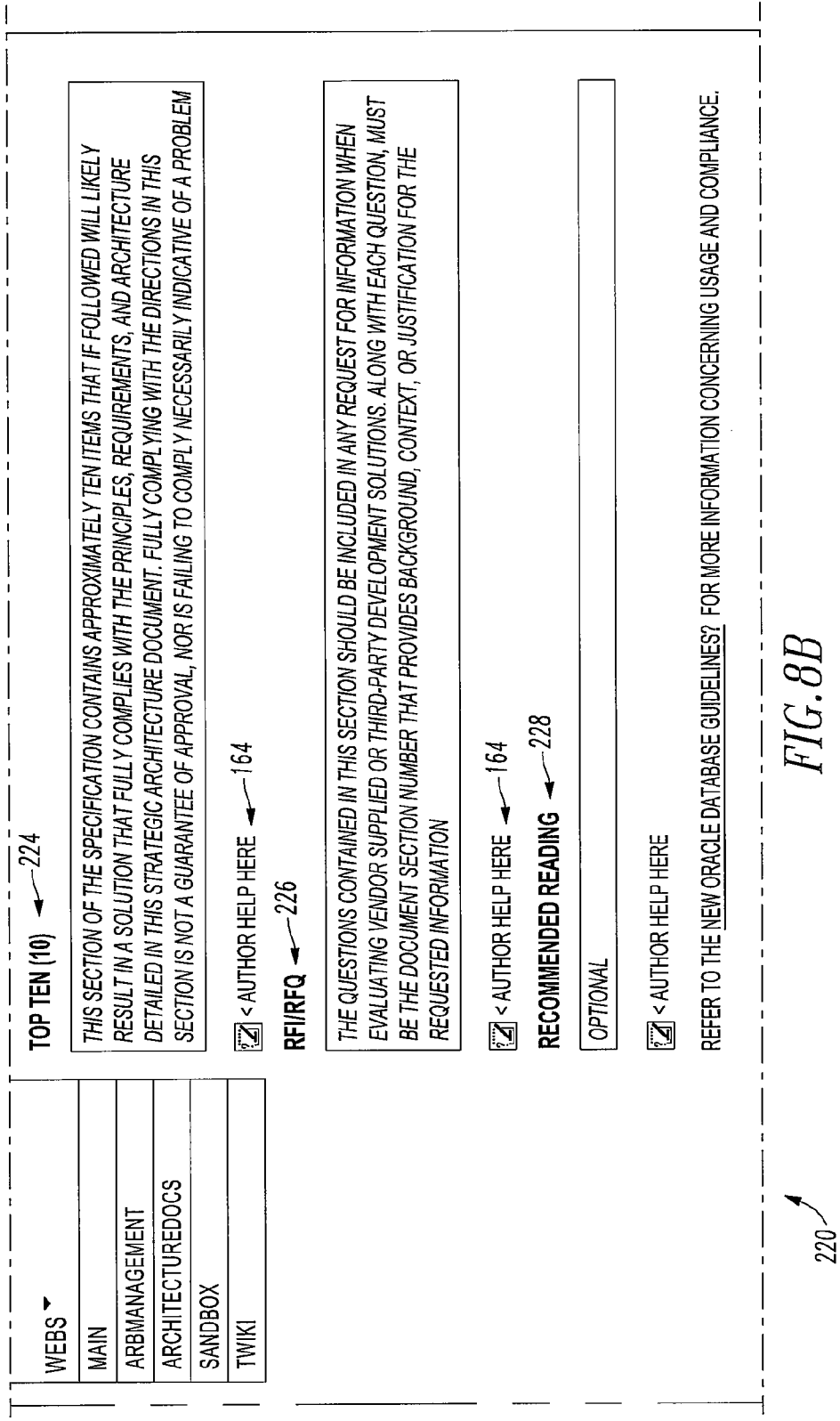
Figure 8C:
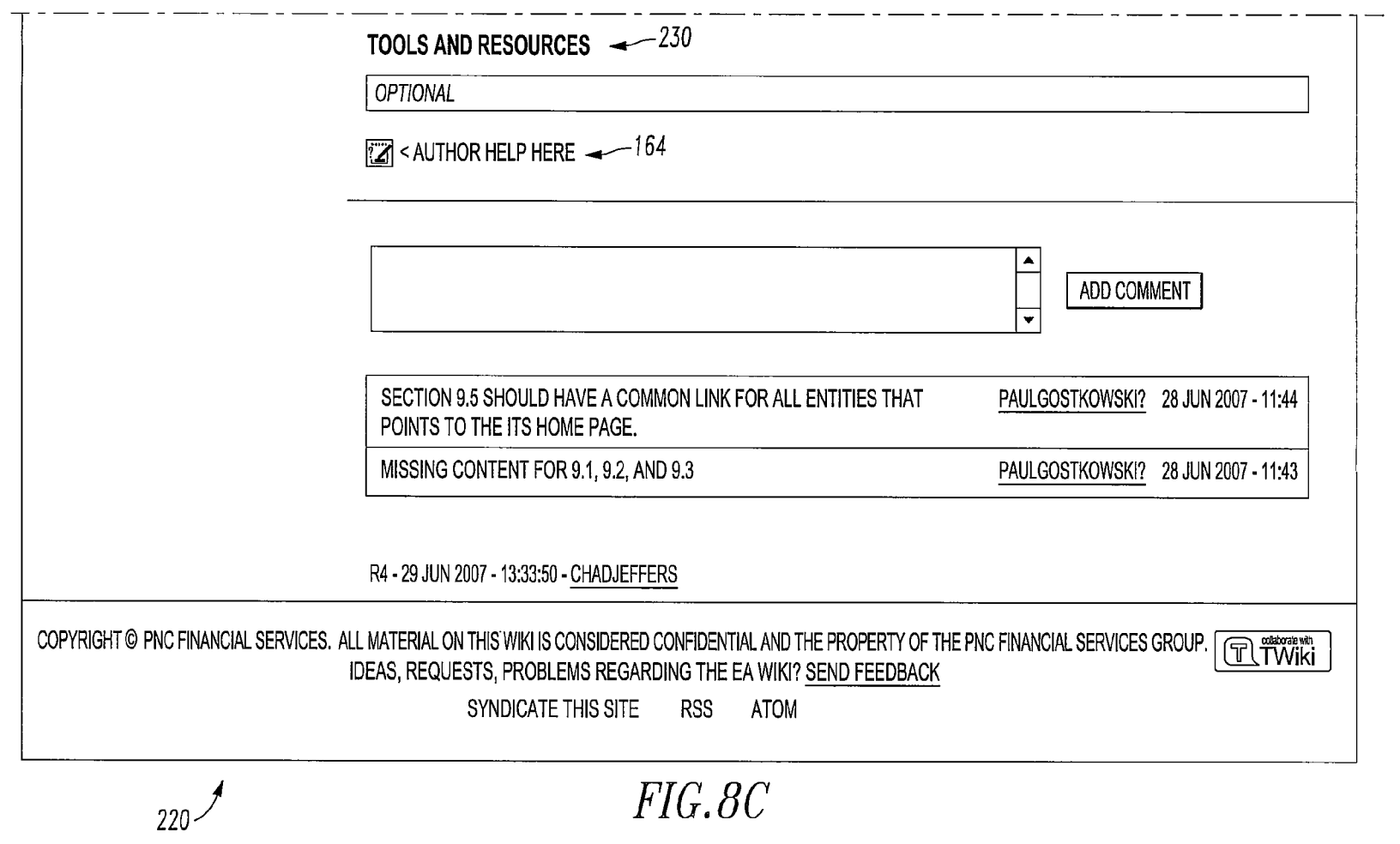

As shown in FIGS. 8A-8C, selecting reference feature 210 may access a reference page 220. As appreciated by those skilled in the art, the reference page 220 may be displayed in any suitable format, such as a webpage or a pop up screen, for example. The reference page 220 may include various sections to help the user. For example, the reference page may include a Frequently Asked Question section 222, a top ten section 224, a RFI/RFQ section 226, a Recommended Reading section 228, and/or a Tools and Resources Section 230. Various embodiments of the reference page 220 may include more or fewer sections. As illustrated, the various sections of the reference page 220 may include an author help feature 164. Furthermore, the content of the reference page may be modified for edited by the user. For example, the user could access an editor by selecting the edit feature 174 or attach a file by selecting attach feature 176.

The full doc feature 212 (FIG. 1B) may also be selected by the user. Upon selecting the full doc feature 212 a window or page may be displayed to the user that compiles all of the content from webpages associated with the individual units 12-41 into a single window or page. Similarly, the PDF feature 214 may be selected which may provide the user with a compilation of all of the content from the webpages into a single PDF document. In various embodiments, the user can also select any category header, or other identifier or icon, to generate a document containing all of the content stored in that category. For example, if a user selects, or "clicks," on a Definition/What header 82 a webpage may be generated that includes the content from levels 73-81. Similarly, in various embodiments, the user can select any level header, or other identifier or icon, to generate a document containing all of the content stored in that level. For example, if a user selects, or "clicks," on a Scope header 72 a webpage may be generated that includes the content from units 12, 17, 22, 27, 32, and 37.

In various embodiments, the techniques or methods for representing the information in units 12-41 may be standardized or otherwise defined with guidelines. Such standardization of guidelines allows for multiple users of the framework 10 to contribute or update information in a common format. Using a common format allows for easier communication and understanding of the information being conveyed through the architecture diagrams.

Figure 9:
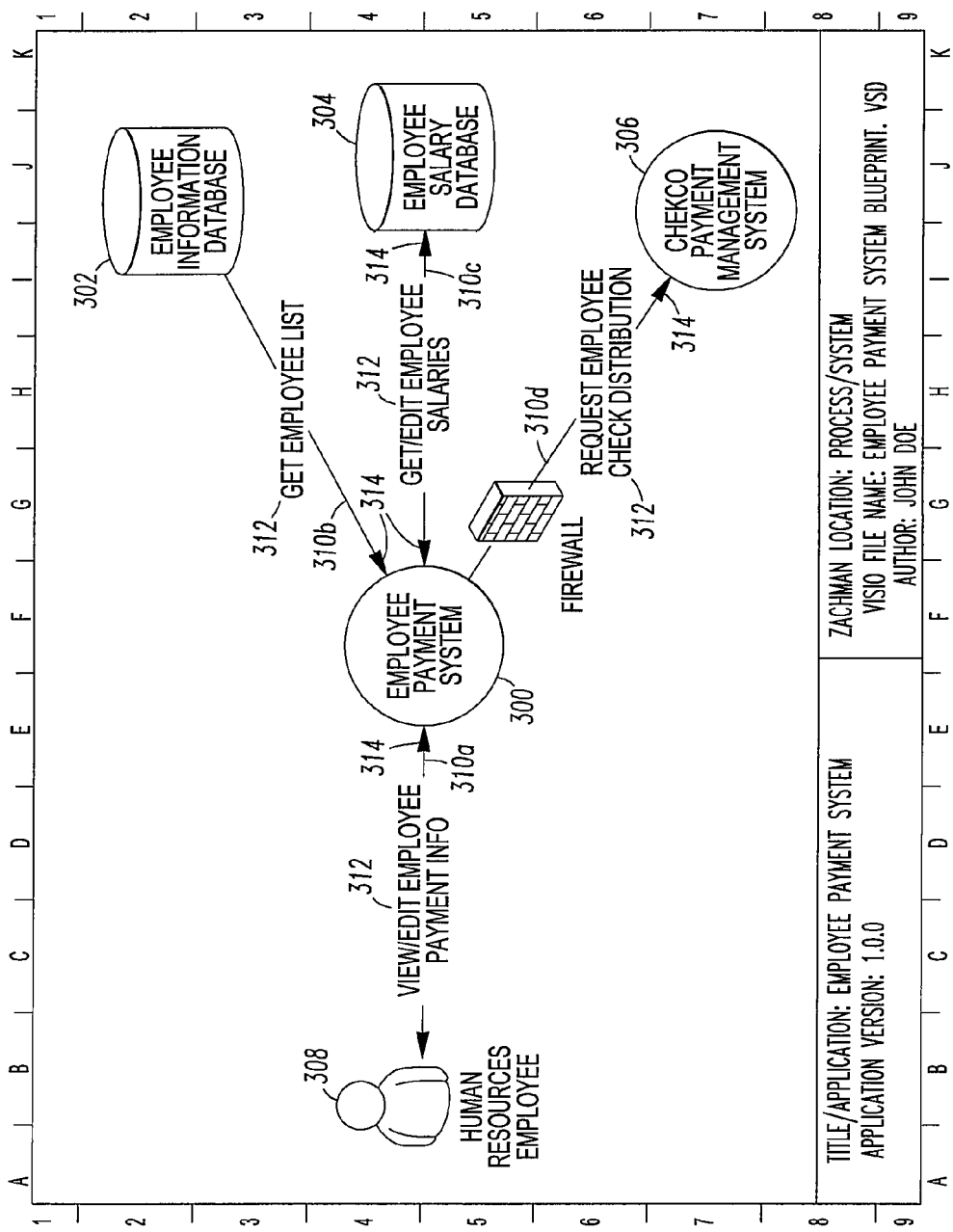
FIG. 9 is a diagram of the architectural content of a unit of the framework according to one embodiment.

As illustrated in FIG. 9, the creation of content in the unit 19 (FIG. 1B) corresponding with the "Processes-How" category 96 and the "System Model" level 77 may be standardized using graphical guidelines. In various embodiments, the content of this unit 19 emphasizes at a relatively high level the interactivity between an application 300 and systems with which the application interfaces. In the illustrated embodiment, the application 300 is shown as an "Employee Payment System." As may be appreciated, in various embodiments, the application 300 may be any type of application and is not limited to an "Employee Payment System." Furthermore, the application 300 may be an existing application within the enterprise architecture, or may be a suggested application that is in the development process. As shown in the illustrated embodiment, the application 300 interacts with various systems, such as an employee information database 302, an employee salary database 304, a checkco paycheck management system 306, and a human resource employee 308. As is to be appreciated, the systems and interactions illustrated in FIG. 9 are purely for illustrative purposes and other applications may interact with a variety of other systems. The application 300 may be diagrammatically connected to the various systems using connectors 310. To aid in conveying the architecture information, the connectors 310 may be identified with a label 312 to describe the purpose of the connection. As illustrated, various connectors 310 may comprise an arrow 314 to denote the direction of information flow. As illustrated in FIG. 9, in various embodiments, the application may be generally placed in the center of a diagram with a circle, with all of the various external applications and systems surrounding it. In various embodiments, all connectors are labeled to describe the business purposes of the connection.

Figure 10:
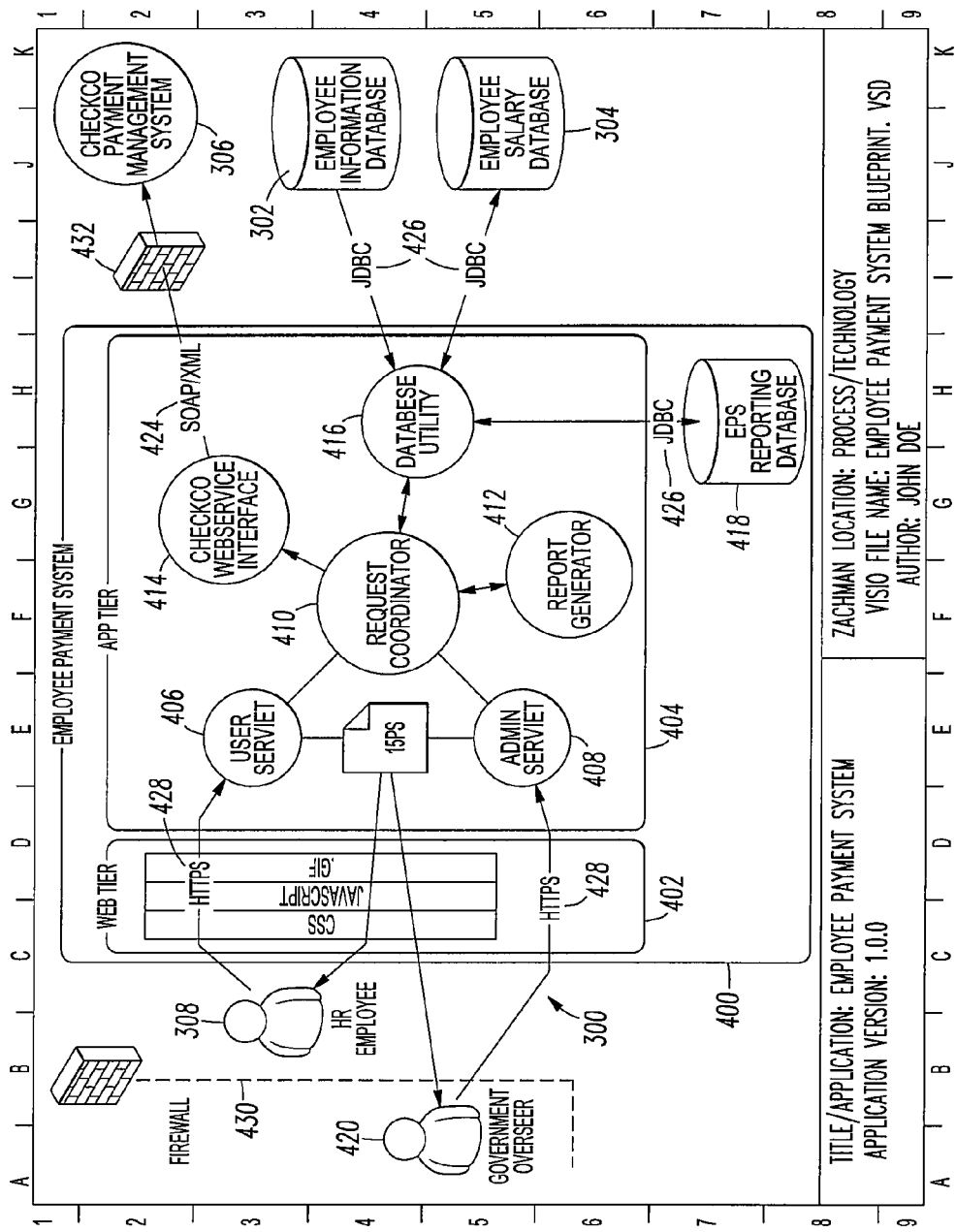
FIG. 10 is a diagram of the architectural content of a unit of the framework according to one embodiment.

As illustrated in FIG. 10, the creation of content in the unit 20 (FIG. 1B) corresponding with the "Processes-How" category 96 and the "Technology Model" level 79 may be standardized using graphical guidelines. In various embodiments, the content of this unit 20 increases the level of detail as compared to unit 19 (FIG. 9). In unit 20, the application 300 from unit 19 may be changed to a container 400. As illustrated, the container 400 may be shown to house various internal components, such as a web tier 402 and an application tier 404. As is to be appreciated, a variety of internal components may be depicted in different architecture diagrams. Within the internal components of the application 300, major application components may be represented. In the illustrated embodiment, the illustrated major applications comprise a user servlet 406, an administrative servlet 408, a request coordinator 410, a report generator 412, a checkco webservice interface 414, and a database utility 416. Other components internal to the application 300, such as a database 418, may be included. Similar to FIG. 9, various systems that the container 400 interacts with may be illustrated. As shown in FIG. 10, the employee information database 302, the employee salary database 304, the checkco paycheck management system 306, and the human resources employee 308 are illustrated. In this diagram, since relatively more detail is included as compared to FIG. 9, additional components, such as a government overseer 420 may be included. Additionally, other components, such as a firewall 430 may be included. In this diagram, communication protocols, such as SOAP/XML 424, JDBC 426, and HTTPS 428 may be provided.

Figure 11:
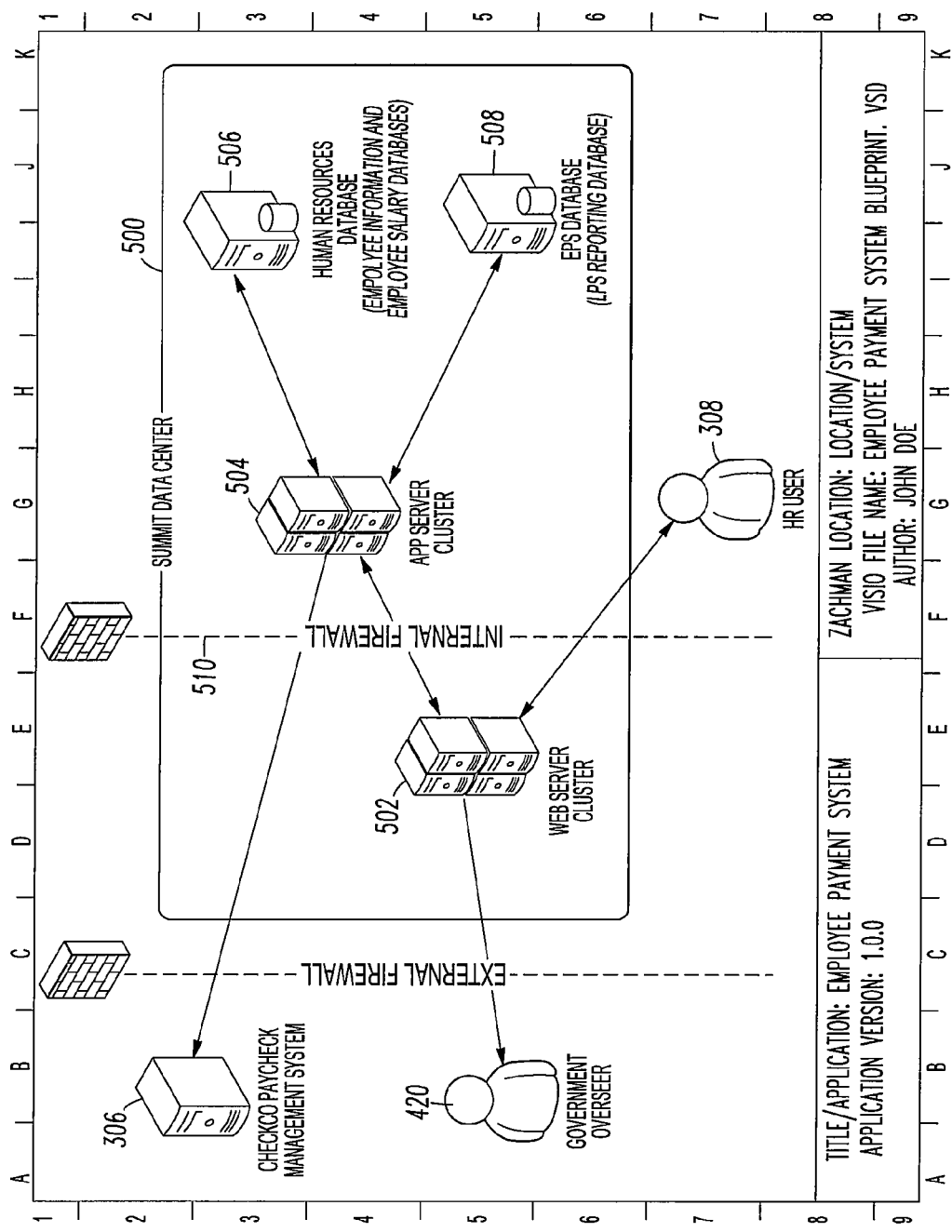
FIG. 11 is a diagram of the architectural content of a unit of the framework according to one embodiment.

As illustrated in FIG. 11, the creation of content in the unit 24 (FIG. 1B) corresponding with the "Location-Where" category 98 and the "System Model" level 77 may be standardized using graphical guidelines. In various embodiments, the content of this unit 24 may focus on the functionally clustered servers/environments employed by the applications or systems being illustrated by the diagram. In one embodiment, the diagram corresponding with the unit 24 is organized spatially by separating external firewalled components and internal network component and users. Data centers may be represented on the diagram as a container that holds the appropriate servers for the data center. As illustrated in one embodiment, a container 500 represents a data center. Within the container 500, various components are illustrated, such as a web server cluster 502, an application server cluster 504, a human resources database 506, and an EPS database 508. Groups of servers that perform the same function or have similar configurations, such as clustered servers or active/passive configurations, for example, may be represented with a server cluster icon. Functionality that is hosted on a single server may be represented with a single server on the diagram. While human resources database 506 is shown as two databases 302 and 304 in FIG. 9, in FIG. 10 the databases are represented as a single element since the two databases reside in the same component. As shown in the illustrated embodiment, a firewall 510 may separate various components of the container 500. An external firewall 512 may separate the container 500 from external components, such as the government overseer 420 and the checkco paycheck management system 306. In various embodiments, external systems may be reflected as either a cluster icon or a single-unit icon. As is to be appreciated, the illustrated components are merely illustrative and are not intended to be limiting. Various applications and systems may have different internal and external components.

Figure 12:
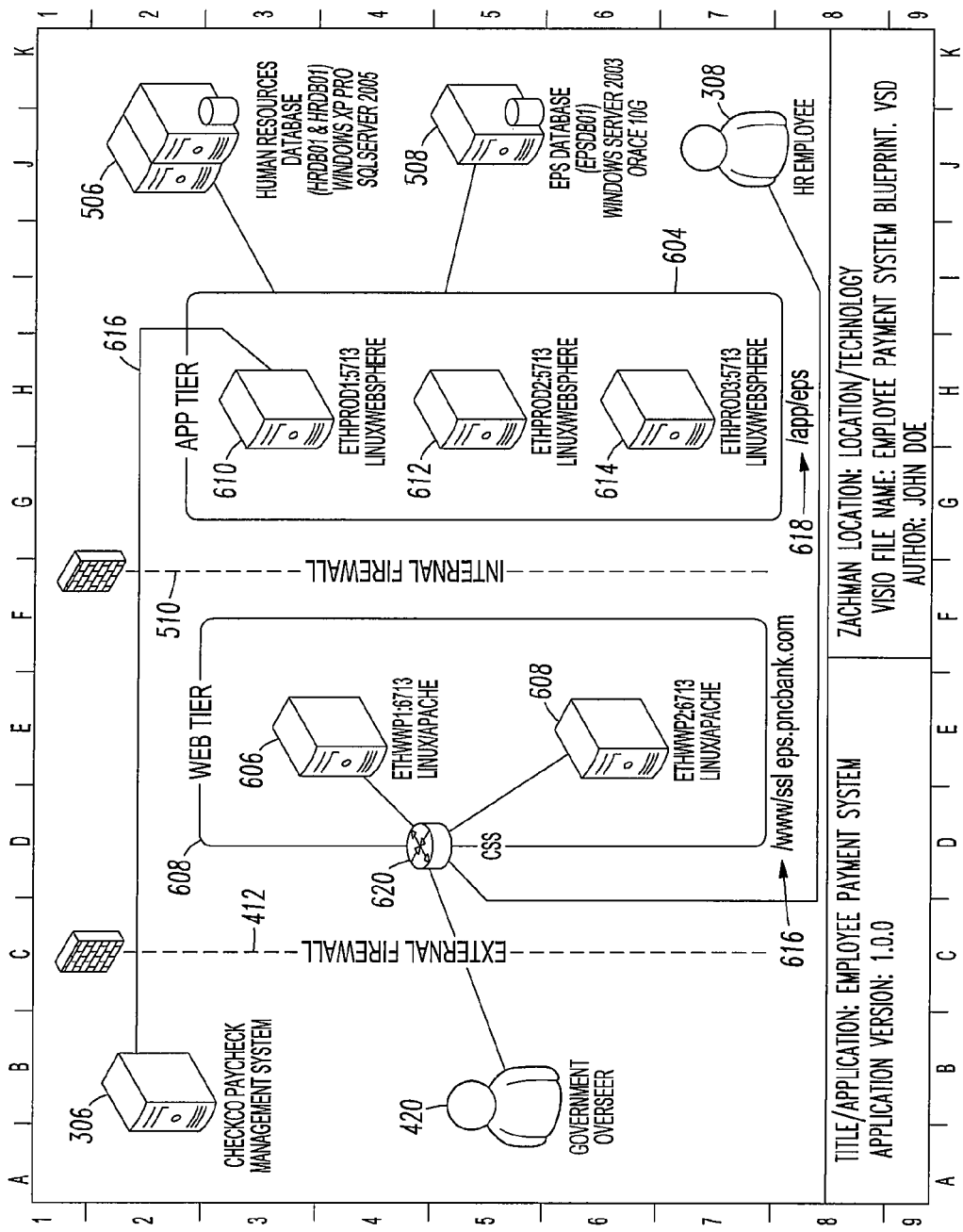
FIG. 12 is a diagram of the architectural content of a unit of the framework according to one embodiment.

The creation of content in the unit 25 (FIG. 1B) corresponding with the "Location-Where" category 98 and the "Technology Model" level 79 may be standardized using graphical guidelines. In various embodiments, as illustrated in FIG. 12, the content of this unit 25 may comprise representations of individual servers on which a subject application resides and the connectivity between them. In one embodiment, as illustrated in FIG. 12, the unit 25 may comprise a web tier 602 and an application tier 604. The web tier 602 may graphically contain various components, such as a server 606 and a server 608. Pertinent information about the servers, such as server name, operating system, prominent installed software, deployment path, port numbers, and configuration settings of interest, for example, may be depicted on this diagram. As illustrated, the servers 606, 608 may be identified with various descriptions, such as machine name ("ethwwpl"), port ("6713"), and relevant software ("Linux/Apache"), for example. The application tier 604 may graphically contain various components, such as a server 610, a server 612, and a server 614. As illustrated by connection 616, the specific connection between the server 610 and the checkco payment management system is illustrated. As with other diagrams, the diagram for unit 25 may comprise various firewalls, such as an internal firewall 510 and an external firewall 512. Systems with which the subject application will interact with may also be represented on this diagram, although in some embodiments, additional information about these externals systems need not be included on the diagram unless it is pertinent to the subject application. In one embodiment, connections from servers clusters may be assumed to be "many-to-one" connections if one line is drawn from the cluster boundary to the connecting component. This approach prevents a spider web effect that may develop if all of the actual connections are visible in the diagram. If one box in the cluster behaves differently by being the only server in the cluster to connect to a particular system, for example, then the connection may be tied to that particular server or component. In the illustrated embodiment, path information 616 may be included for the web tier 602 and path information 618 may be included for the application tier 604. Additionally, in various embodiments, the web tier 602 may be shown to graphically connect to cascading style sheets 620.

Figure 13:
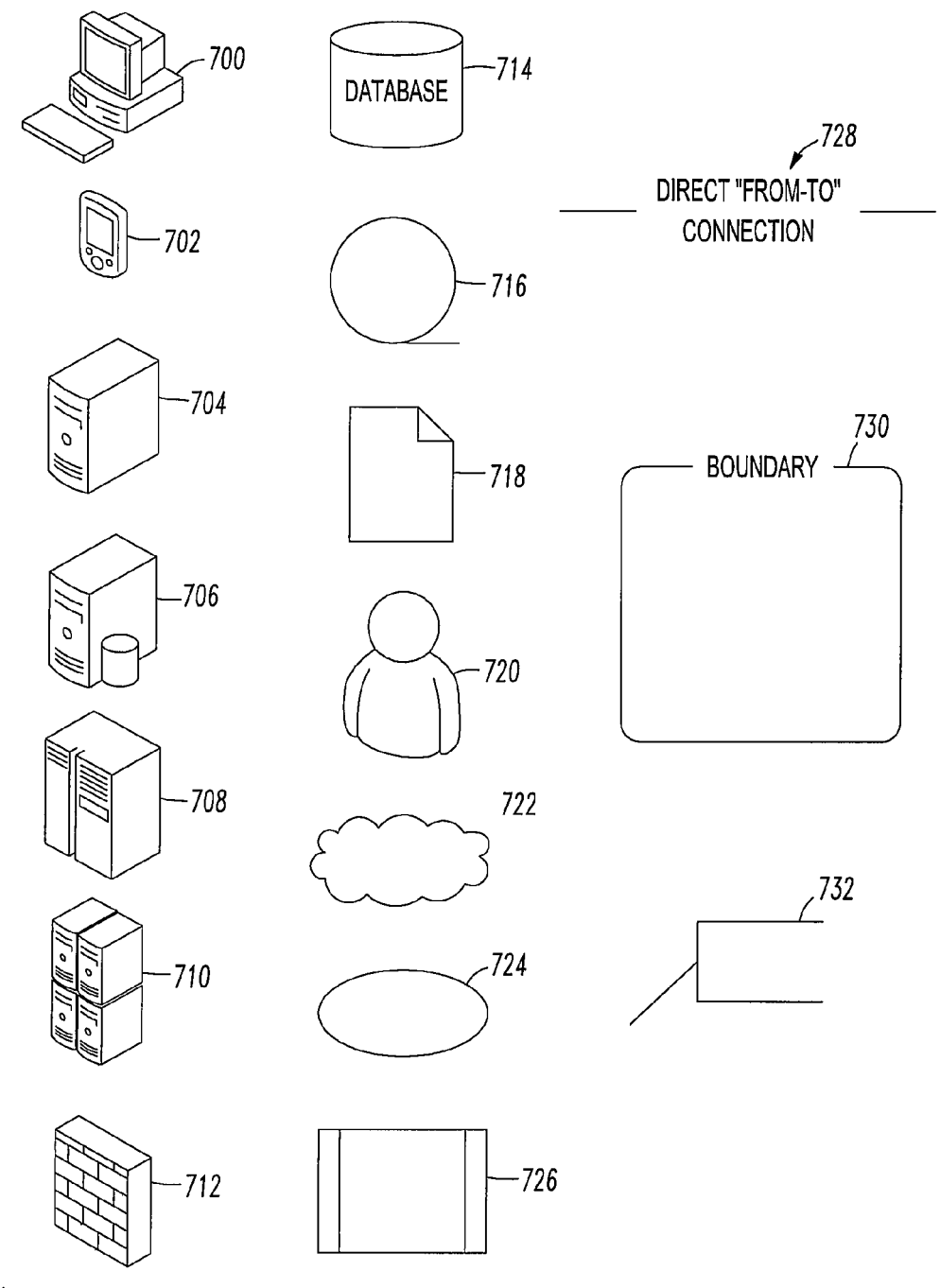
FIG. 13 illustrates example icons according to one embodiment.

As various diagrams are developed and updated for the units 19, 20, 24, and 25, standardized icons may be used. These standardized icons may be used by users when creating the architecture diagrams in order to provide consistency between various diagrams. Such consistency leads to more efficient conveyance of information. In accordance with one embodiment, example standardized icons are illustrated in FIG. 13. A computer icon 700 may be used for representing an end user's personal computer. A mobile device icon 702 may be used for representing an end-user's mobile device, such as a cell phone or a personal data assistant, for example. A sever icon 704 may be used for representing individual server machines. The operating system and software on the system may be described in connection with the server icon 704. In various embodiments, in lower level diagrams, multiple server icons 704 may be used to indicate clustering. A database server icon 706 may be used for representing individual database server machines. The operating system and software on the associated database server machine may be indicated.

Still referring to FIG. 13, a mainframe device icon 708 may be used for representing mainframe devices. Software residing on the mainframe device associated with the icon may be indicated. In various embodiments, in lower level diagrams, multiple mainframe icons 708 may be used to indicate clustering. A sever cluster Icon 710 may be used for representing server clusters. In various embodiments, in high-level diagrams, this server cluster icon 710 may be used to represent server clusters as opposed to the server icon 704. A firewall icon 712 may be used for representing firewalls employed within the organization. If used by themselves, process flow lines may pass through the firewall icon 712. Otherwise, additional lines, such as vertical lines, may be used in addition to the firewall icon 712 to graphically indicate firewall zone separation. A product-based data store icon 714 may be used for representing product-based data stores, such as an Oracle SQL server, for example. The operating system, the software platform, and/or other details may be added to the icon to provide additional information regarding the product-based data store. A tape-based media icon 716 may be used for representing data used by a system that is stored on a tape-based media. In various embodiments, the tape-based media icon 716 may be used to indicate data backup. As with other icons, related information about the media may be associated with the icon on a diagram.

Still referring to FIG. 13, a file system icon 718 may be used for representing a file system, such as a folder, drive location, or a flat-file data-record, for example. A user icon 720 may be used for representing users of the system. An internet icon 722 may be used for representing the internet or other types of networks, such as wireless or wireline networks. An entity icon 724 may be used for representing entities on the diagrams, such as an application, or other entity that may not be graphically represented as a process icon. A process icon 726 may be used for representing processes. For example, the process icon 726 may be used for representing sorting, converting, filter, combining, or any other applicable process. A connector icon 728 may be used for indicating a connection between two diagram entities or processes. The direction of the arrow on an end of the connector icon 728 indicates flow from the originator to the destination. In various embodiments, communication protocols and/or security considerations may be placed with the connector. A boundary icon 730 may be used in either physical or procedural architecture diagrams and may group related diagram entities. In various embodiments, the boundary icon 730 may be used to tie low-level architecture diagrams to higher level architecture diagrams. A callout icon 732 may be used on the diagram to add additional information about specific icons within the diagram, such as communication protocol information or operating system information, for example. As is to be appreciated, the icons 700-732 are provided for illustrative purposes only and are not intended to be limiting. In various embodiments, more or less icons may be used and different icons may be used.

For corporations or businesses have multiple groups, units, divisions, or departments, it is appreciated that an individual framework 10 may be maintained for each individual group. In various embodiments, members of the internal group may access and continually update its framework 10 through an intranet, for example. Depending on the purpose and responsibility of the group, the content of the individual frameworks may vary. For example, a corporation might have a web application group, a network security group, a human resources group, an accounting group, a sales group, and a database group. Each of these groups may maintain a separate user-editable framework 10 to store and display information relevant to the group. The various units of the framework would provide varying levels of granularity for the various functions and purposes of the group. It is appreciated that a unit within a framework 10 for one group, may include links (such as hyperlinks) to a unit within the framework 10 of another group. It is also appreciated that varying levels of permissions may be granted to different users. For instance, only certain users may be given permission to make edits and/or attach files. Some implementations might utilize a Primary Content Owner who is responsible for maintaining the information, keeping it accurate and up to date.

It is appreciated that the user-editable webpages of framework 10 may be used in connection with a variety of institutional information and documentation, such as information related to enterprise architecture.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, table layouts, or report formats described herein are necessarily intended to limit the scope of the invention.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN); storage area network (SAN); or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A computer implemented system for storing enterprise architecture, the computer implemented system comprising:

a non-transitory computer-readable medium storing a framework of units displayed by a computer-based device, wherein the framework comprises a set of levels and a set of categories, and each of the units are associated with one of the levels and one of the categories and wherein the levels comprise at least a system model level and a technology model level and the categories comprise at least a processes category, and wherein the framework is stored in a non-transitory computer-readable medium;

enterprise architecture content stored in the framework, wherein the level of detail downwardly progresses from broad to narrow between vertically sequential levels in each category of the set of categories;

a first enterprise architecture diagram created in accordance with a first set of graphical guidelines and comprising a first plurality of standardized graphical components to visually represent a first enterprise architecture, wherein the first enterprise architecture diagram represents enterprise architecture content from a first unit in the system model level and the processes category of the framework;

a second enterprise architecture diagram created in accordance with a second set of graphical guidelines and comprising a second plurality of standardized graphical components to visually represent a second enterprise architecture, wherein the second enterprise architecture diagram represents enterprise architecture content from a second unit in the technology model level and the processes category of the framework, and wherein the second enterprise architecture diagram is stored in the non-transitory computer-readable medium;

at least one selectable header to select a corresponding level or category within the framework of units, and is programmed to generate a document containing the enterprise architecture content from all units in the framework belonging to the corresponding level or category upon selection of the header;

a plurality of user-editable webpages stored in the non-transitory computer readable medium, wherein each unit in the framework corresponds to at least one of the plurality of user-editable webpages, wherein each user-editable webpage is accessed by selecting one of the units in the framework with an input device, wherein a first user-editable webpage corresponding to the system model level and the processes category displays the first enterprise architecture diagram upon selection of the first unit and wherein a second user-editable webpage corresponding to the technology model level and the processes category displays the second enterprise architecture diagram upon selection of the second unit; and an editor permitting a plurality of users to view and modify each of the first or second user-editable webpages via a webpage interface; and wherein the first set of graphical guidelines corresponds to a first common format applicable to the user modifications of the first user-editable webpage;

wherein the second set of graphical guidelines corresponds to a second common format applicable to the user modifications of the second user-editable webpage.

2. The system of claim 1, wherein the technology model level comprises information related to at least one of application components, interactions of application components, infrastructure elements, connectivity of infrastructure elements, and deployment details of purchased commercial products.

3. The system of claim 1, wherein the levels comprise at least a scope level, a business model level, and a detailed representation level, wherein the scope level comprises enterprise architecture information that is provided at a broader level of granularity than any other of the levels, wherein the business model level comprises enterprise architecture information that is valuable to business units that interact with a predetermined department, and wherein the detailed representation level comprises at least one of application source code, employee directories, IP address tables, and stock prices.

4. The system of claim 1, wherein the categories comprise at least a definition category, an organization category, a time category, and a rationale category, wherein the definition category comprises information related to at least one of server uptime, network throughput, and request turnover times, wherein the organization category comprises information related to different positions within a predetermined department and skills required to perform the different positions within the predetermined department, wherein the time category comprises information related to a monthly schedule, a quarterly schedule, a year-end freeze schedule, reoccurring capacity appraisals, yearly budget planning, and employee evaluations, and wherein the rationale category comprises information related to providing a service, increasing revenue, and complying with a specific regulatory requirement.

5. The system of claim 1, further comprising a third enterprise architecture diagram created in accordance with a third set of graphical guidelines and comprising a third plurality of standardized graphical components to visually represent a third enterprise architecture, wherein the third enterprise architecture diagram corresponds to a third unit in the system model level and a location category of the framework, and wherein the third enterprise architecture diagram is stored in a non-transitory computer-readable medium, wherein a third user-editable webpage corresponding to the system model level and the location category of the framework displays the third enterprise architecture diagram, and wherein the third set of guidelines corresponds to a third common format applicable to user modifications of the third user-editable webpage, wherein upon selection of the first, second, or third units, displaying the first, second, or third enterprise architecture diagrams, respectively.

6. The system of claim 5, further comprising a fourth enterprise architecture diagram created in accordance with a fourth set of graphical guidelines and comprising a fourth plurality of standardized graphical components to visually represent a fourth enterprise architecture, wherein the fourth enterprise architecture diagram corresponds to a fourth unit in the technology model level and the location category of the framework, and wherein the fourth enterprise architecture diagram is stored in a non-transitory computer-readable medium, wherein a fourth user-editable webpage corresponding to the technology model level and the location category of the framework displays the fourth enterprise architecture diagram, and wherein the fourth set of guidelines corresponds to a fourth common format applicable to user modifications of the fourth user-editable webpage, wherein upon selection of the first, second, third, or fourth units, displaying the second, third, or fourth enterprise architecture diagrams, respectively.

7. The system of claim 6, wherein the levels comprise a business model level and wherein the system further comprises a fifth enterprise architecture diagram created in accordance with a fifth set of graphical guidelines and comprising a fifth plurality of standardized graphical components to visually represent a fifth enterprise architecture, wherein the fifth enterprise architecture diagram corresponds to a fifth unit in the business model level and the processes category of the framework, and wherein the fifth enterprise architecture diagram is stored in a non-transitory computer-readable medium, wherein a fifth user-editable webpage corresponding to the business model level and the processes category of the framework displays the fifth enterprise architecture diagram, and wherein the fifth set of guidelines corresponds to a fifth common format applicable to user modifications of the fifth user-editable webpage, wherein upon selection of the first, second, third, fourth, or fifth units, displaying one of the first, second, third, fourth, or fifth enterprise architecture diagrams, respectively.

8. The system of claim 1, wherein the system model level comprises information related to at least one of request systems and available services.

9. The system of claim 1, wherein the first user-editable webpage and the second user-editable webpage each comprise at least one standardized icon selected from a set of standardized icons, wherein the at least one standardized icon of the first user-editable webpage corresponds to the first common format and wherein the at least one standardized icon of the second user-editable webpage corresponds to the second common format.

10. A computer implemented system, the computer implemented system comprising:

a framework of units displayed on a web application using a computer system, wherein the framework comprises a set of levels and a set of categories implemented using one of a plurality of schemas, and each of the units are associated with one of the levels and one of the categories, and wherein each individual unit of the framework is associated with a user-editable webpage;

wherein each schema in the plurality of schemas provide a level of detail for enterprise architecture content included on each user-editable webpage wherein the level of detail downwardly progresses from broad to narrow, wherein the schemas comprise a set of levels and a set of categories, wherein the levels comprise at least a scope level, a business model level, a system model level, a technology model level and a detailed representations level, and the categories comprise at least a definition category, a processes category, a location category, an organization category, a time category and a rationale category;

at least one selectable header to select a corresponding level or category within the framework of units, and is programmed to generate a document containing the enterprise architecture content from all units in the framework belonging to the corresponding level or category upon selection of the header;

a non-transitory computer readable medium storing a plurality of user-editable webpages, wherein the plurality of user-editable webpages each include an enterprise architecture diagram, wherein the plurality of user-editable webpages are managed by a wiki interface, wherein the enterprise diagrams are created in accordance with a set of graphical guidelines and comprising a plurality of standardized graphical components to visually represent an enterprise architecture, wherein a first enterprise architecture diagram of the enterprise architecture diagrams corresponds to the system model level and the processes category of the framework and a second enterprise architecture diagram corresponds to the system model level and the location category of the framework; and an input device, wherein selection of one of the units in the framework accesses its associated user-editable webpage; and wherein a first user-editable webpage of the plurality of user-editable webpages corresponding to the system model level and the processes category displays the first enterprise architecture diagram, upon selection of a first unit in the framework; and wherein a second user-editable webpage of the plurality of user-editable webpages corresponding to the technology model level and the processes category displays the second enterprise architecture diagram, upon selection of a second unit in the framework; and wherein a first set of graphical guidelines corresponds to a first common format that is applicable when users make modifications to the first user-editable webpage;

wherein a second set of graphical guidelines corresponds to a second common format that is applicable when users make user modifications to the second user-editable webpage.

11. The system of claim 10, further comprising a feature for compiling the content of the plurality of user-modifiable webpages into a single webpage.

12. The system of claim 10, further comprising a third enterprise architecture diagram created in accordance with a third set of graphical guidelines and comprising a plurality of standardized graphical components to visually represent a third enterprise architecture, wherein the third enterprise diagram corresponds to the technology model level and the processes category of the framework, wherein upon selection of the first, second, or third units, displaying the first, second, or third enterprise architecture diagrams, respectively.

13. The system of claim 12, further comprising a fourth enterprise architecture diagram created in accordance with a fourth set of graphical guidelines and comprising a plurality of standardized graphical components to visually represent an fourth enterprise architecture, wherein the fourth enterprise diagram corresponds to the technology model level and the location category of the framework, wherein upon selection of the first, second, third or fourth units, displaying the first, second, third, or fourth enterprise architecture diagrams, respectively.

14. The system of claim 13, further comprising a fifth enterprise architecture diagram created in accordance with a fifth set of graphical guidelines and comprising a plurality of standardized graphical components to visually represent a fifth enterprise architecture, wherein the fifth enterprise diagram corresponds to the business model level and the location category of the framework, wherein upon selection of the first, second, third, fourth or fifth units, displaying the first, second, third, fourth, or fifth enterprise architecture diagrams, respectively.

15. A computer implemented system, the computer implemented system comprising:

a framework of units displayed on a web application using a computer system, wherein the framework comprises a set of levels and a set of categories, and each of the units are associated with one of the levels and one of the categories, and wherein each individual unit of the framework is associated with a user-editable webpage; a plurality of schemas, the schemas providing a level of detail for enterprise architecture content included on each user-editable webpage wherein the level of detail downwardly progresses from broad to narrow, wherein the schemas comprise a set of levels and a set of categories, wherein the levels comprise at least a scope level, a business model level, a system model level, a technology model level and a detailed representations level, and the categories comprise at least a definition category, a processes category, a location category, an organization category, a time category and a rationale category;

at least one selectable header to select a corresponding level or category within the framework of units, and is programmed to generate a document containing the enterprise architecture content from all units in the framework belonging to the corresponding level or category upon selection of the header;

a non-transitory computer readable medium storing a plurality of user-editable webpages, wherein each user-editable webpage includes an enterprise architecture diagram, wherein the plurality of user-editable webpages are managed as a wiki interface;

wherein a first enterprise diagram is created in accordance with a first set of graphical guidelines and comprising a first plurality of standardized graphical components to visually represent a first enterprise architecture, wherein the first enterprise diagram corresponds to the system model level and the processes category of the framework;

wherein a second enterprise diagram is created in accordance with a second set of graphical guidelines and comprising a second plurality of standardized graphical components to visually represent a second enterprise architecture, wherein the second enterprise diagram corresponds to the system model level and the location category of the framework;

wherein a third enterprise diagram is created in accordance with a third set of graphical guidelines and comprising a third plurality of standardized graphical components to visually represent a third enterprise architecture, wherein the third enterprise diagram corresponds to the technology model level and the processes category of the framework; and wherein a fourth enterprise diagram is created in accordance with a fourth set of graphical guidelines and comprising a fourth plurality of standardized graphical components to visually represent a fourth enterprise architecture, wherein the fourth enterprise diagram corresponds to the technology model level and the location category of the framework; and an input device, wherein selection of one of the units in the framework accesses its associated user-editable webpage; and wherein a first user-editable webpage of the plurality of user-editable webpages corresponding to the system model level and the processes category displays the first enterprise architecture diagram, upon selection of a first unit in the framework; and wherein a second user-editable webpage of the plurality of user-editable webpages corresponding to the technology model level and the processes category displays the second enterprise architecture diagram, upon selection of a second unit in the framework; and wherein the first set of graphical guidelines corresponds to a first common format that is applicable when users make modifications to the first user-editable webpage;

wherein the second set of graphical guidelines corresponds to a second common format that is applicable when users make modifications to the second user-editable webpage.

16. The system of claim 15, wherein the first enterprise diagram comprises a visual representation of an application and systems with which the application interfaces.

17. The system of claim 15, wherein the third enterprise diagram comprises a visual representation of at least one internal component of the application, wherein the at least one internal component is selected from the group consisting of a user servlet, an administrative servlet, a request coordinator, a report generator, a webservice interface, and a database utility.

18. The system of claim 15, wherein the fourth enterprise diagram comprises a visual representation of at least one server associated with the application, and wherein the visual representation comprises at least one of a server name, a server operating system, prominent software installed on a server, a deployment path of a server, port numbers of a server, and configuration settings of a server.

19. The system of claim 15, wherein a fifth enterprise diagram is created in accordance with a fifth set of graphical guidelines and comprising a fifth plurality of standardized graphical components to visually represent a fourth enterprise architecture, wherein the fifth enterprise diagram corresponds to the business model level and the processes category of the framework, wherein upon selection of the first, second, third, fourth or fifth enterprise architecture diagrams, displaying the first, second, third, fourth, or fifth enterprise architecture diagrams, respectively.

20. The system of claim 15, wherein the second enterprise diagram comprises a data center, wherein the data center comprises at least one server, and wherein the second enterprise diagram is organized spatially by separating external components from internal components and users.

* * * * *